June 4, 1963 W. I. DENTON ET AL 3,092,669
GLYCEROL FROM ALLYL ALCOHOL
Filed Dec. 24, 1959
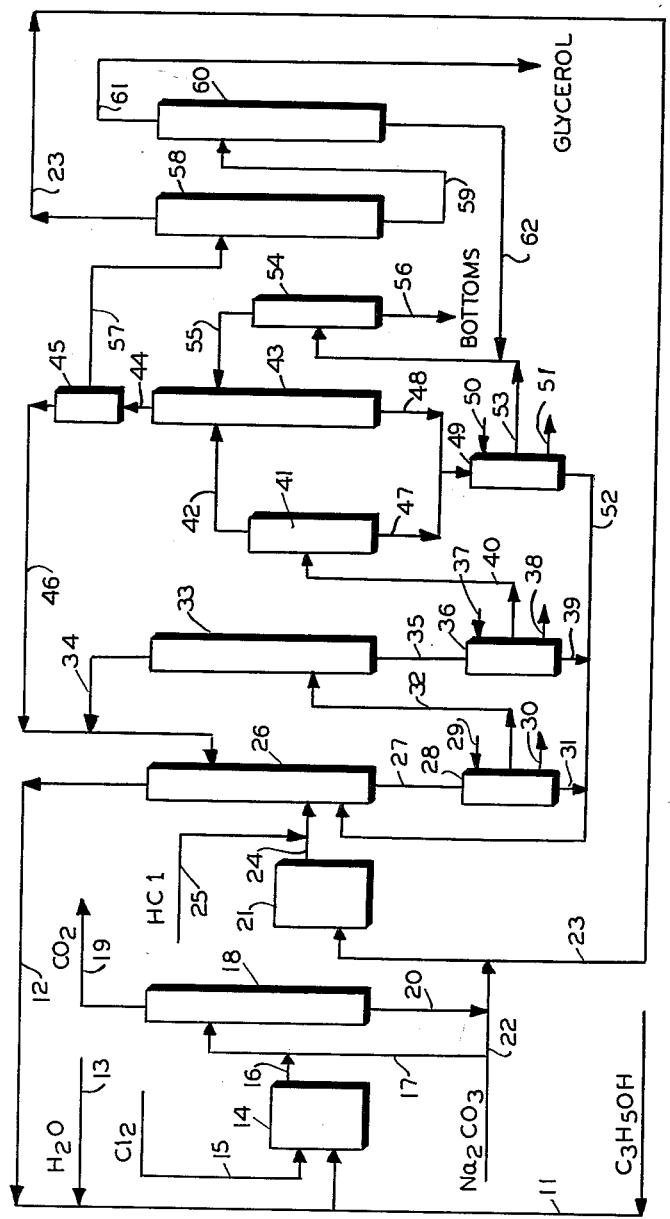
INVENTORS
WILLIAM I. DENTON
JOHN D. NEWKIRK
BY Gordon D Byrkit
AGENT 3,092,669
Patented June 4, 1963

3,092,669
GLYCEROL FROM ALLYL ALCOHOL
William I. Denton, Cheshire, and John D. Newkirk, Woodbridge, Conn., assignors to Olin Mathieson Chemical Corporation, a corporation of Virginia
Filed Dec. 24, 1959, Ser. No. 861,944
2 Claims. (Cl. 260—635)

This invention relates to improvements in the conversion of allyl alcohol to glycerol and more particularly relates to improvements in processing operations whereby commercially important economies are achieved.

Known steps in the conversion of allyl alcohol to glycerol generally comprise a first step of conversion of the allyl alcohol to glycerol chlorohydrins, a second step of hydrolysis of the chlorohydrins to dilute glycerol and separation of the glycerol from the hydrolysis liquor. The first step is a chemical reaction carried out by reacting allyl alcohol with chlorine in dilute aqueous solution. The second step is a chemical reaction carried out by mixing the aqueous solution of monochlorohydrins which may contain minor amounts of glycerol dichlorohydrins with aqueous alkalies and heating to effect hydrolysis to glycerol. The dilute glycerol solution is concentrated, salt is separated and finally glycerol is distilled overhead.

More recently improvements in the above-outlined process have been devised in which the hypochlorination of allyl alcohol is accomplished by maintaining a circulating body of dilute glycerol chlorohydrins at suitable reaction temperatures, introducing gaseous chlorine and dissolving it in the circulating liquor, introducing fresh aqueous allyl alcohol as a separate stream and removing as product a portion of the circulating liquor at a point sufficiently downstream that the reaction is substantially complete. Further improvements have also been made in carrying out this reaction in a simple tubular reactor, injecting chlorine gas and aqueous allyl alcohol as separate streams and removing the total effluent as product.

Further improvements have recently been made in the hydrolysis of the aqueous chlorohydrins from these improved hypochlorination processes using sodium carbonate as the sole alkali. The sodium carbonate is used in an amount from stoichiometric up to an excess of about 25 percent. The hydrolysis operation is carried out by adding the sodium carbonate to a 2 to 10 percent aqueous solution of the monochlorohydrins and heating at temperatures of 120 to 250° C. for 0.1 to 5.0 hours, the time required varying approximately inversely with the temperature.

The improvements of the present invention reside in the treatment of the process streams to and from these improved hypochlorination and hydrolysis operations in a particularly advantageous manner whereby concentrated glycerol of high purity is obtained by distillation alone without requiring any of the usual purification steps, such as solvent extraction, when glycerol is produced by other known synthetic processes.

In the hypochlorination of allyl alcohol as described above, the hypochlorination liquor removed as product is acid due to the formation of by-product hydrochloric acid. The liquor is neutralized with aqueous sodium hydroxide or sodium carbonate to a pH of about 4 to 5. It is a feature of the present invention that the neutralized liquor is then fractionated to remove carbon dioxide resulting from the reaction of sodium carbonate with hydrochloric acid contained in the solution, to remove minor proportions of water and particularly to remove volatile by-products of the hypochlorination reaction which are distilled over because the boiling points of these impurities or their azeotropes with water boil below the boiling point of water. Minor amounts of water, e.g. 0.5 to 5 percent may be removed in this purification and no substantial concentration of the hypochlorination reaction liquor occurs. The aqueous glycerol chlorohydrins are freed from contaminants, many of which are chlorine-containing bodies, and subsequent processing operations lead to pure concentrated glycerol by distillation alone without the necessity of added purification treatment usually required by other processes. The subsequent operations in combination with this purification of the chlorohydrin liquors are effective in producing the advantageous results obtained according to the present invention.

The purified chlorohydrin solution is removed as bottoms from the fractionation step and hydrolyzed as described above with sodium carbonate. The effluent from the hydrolysis step, neutralized with aqueous hydrochloric acid to a pH of about 4 is charged to an evaporating system, for example, a triple effect evaporator. The water removed from the first two (non-salting) stages is used as process water, for example, for dissolving or slurrying sodium carbonate used in the hydrolysis. Overhead sweet water from the final (salting) stage of the evaporator, containing minor amounts of glycerol, is recycled together with make-up water to dilute the allyl alcohol stream charged to the hypochlorination step. It is a feature of the process of the present invention that the glycerol which is taken overhead from the evaporation can be recovered in this way. No substantial losses of glycerol are encountered by passing it through the hypochlorination step although it might be expected that the glycerol would be chlorinated, oxidized or otherwise lost in the process.

The liquor from the final effect of the evaporation system is charged to a salt separating device, preferably a centrifuge, and the precipitated sodium chloride is removed. The liquor at this point, containing about 30 to 40 percent glycerol is charged to a vacuum concentrator which reduces the liquor to an effluent containing about 70 to 80 percent glycerol. The overhead removed from the concentrator contains considerable glycerol accompanying the water. This overhead is recycled to the third effect of the triple effect evaporator combining with the charge stream of acidified hydrolysate effluent from the hydrolysis reactor.

The liquor containing 70 to 80 percent glycerol effluent from the concentrator is flashed overhead under vacuum leaving as bottoms a portion of the glycerol and additional quantities of sodium chloride which precipitate due to removal of water. The salt is separated, washed and discarded. The washings, containing significant amounts of glycerol, are combined with other salt washing liquors and recycled to the final (first) effect of the triple effect evaporator for recovery of the glycerol contained therein. The bottoms, freed from salt, are combined with bottoms from the final refining still and the glycerol is steam vaporized and returned to the flash chamber. The bottoms from this steam vaporizer are discarded.

The vaporized liquor containing 70 to 80 percent glycerol which is flashed overhead is condensed by a partial condenser which passes the remaining water and significant amounts of glycerol. The glycerol is recovered by recycling this overhead stream to the evaporator. The condensate from the partial condenser is charged to a stripping column to remove monochlorohydrins. It is a feature of this invention that, with the prior removal of other more volatile chlorine-containing bodies, unreacted monochlorohydrins can be recovered at this point and recycled to the hydrolysis. The stripped glycerol is finally fractionally distilled preferably by vacuum steam fractionation to obtain a water-white, substantially chlorine-free product meeting U.S.P. specifications. The bottoms from the refining still comprising glycerol with minor amounts of polyglycerols and colored by-products are advantageously returned to the steam vaporizor feeding the 80 percent glycerol flash tower. The bottoms from the steam vaporizer are discarded.

In the flow sheet of the figure herewith, allyl alcohol, $C_3H_5OH$, is introduced via line 11 together with recycle water via line 12 and make-up water via line 13 to hypochlorinator 14. Chlorine is introduced via line 15. The reaction liquor effluent from hypochlorinator 14 is admixed in line 16 with sodium carbonate solution introduced via line 17. The monochlorohydrin solution is thus neutralized to a pH of about 4 and introduced into fractionating column 18. Carbon dioxide, volatile impurities and minor amounts of water are removed overhead via line 19. The bottoms from column 18 are transferred via line 20 to hydrolyzer 21. During the transfer, additional sodium carbonate solution is introduced via line 22 and recycle monochlorohydrin is introduced via line 23. The effluent from the hydrolysis reaction is neutralized in line 24 by dilute hydrochloric acid introduced via line 25 to bring the pH of the liquor to about 4. The liquor is charged to the triple effect evaporating system represented as a single unit 26 from which the overhead water containing minor amounts of glycerol is returned via line 12 as diluent for allyl alcohol and to recover the glycerol contained therein. The evaporated glycerol solution containing suspended salt is passed by line 27 to de-salting equipment preferably a centrifuge 28. The separated salt is washed with water introduced by line 29 and discarded via line 30. The washings are transferred via lines 31 and 52 to evaporator 26. The liquor, containing 30 to 40 percent glycerol, passes by line 32 to vacuum concentrator 33. In concentrating the glycerol from 40 percent to 80 percent, the overhead is largely water but contains significant quantities of glycerol. It is therefore recycled to the evaporator 26 via line 34. The 80 percent glycerol from which additional salt has crystallized is transferred via line 35 to de-salting equipment for example a centrifuge 36. The salt is washed with water introduced by line 37 and the salt is removed via line 38 and the washings via line 39. The latter are combined with other salt wash liquors and returned via line 52 to the evaporator 26. The 80 percent glycerol is transferred via line 40 to flash tower 41 and via line 42 to fractionating columns 43 and then overhead via line 44 to partial condenser 45. The final water passes the partial condenser 45 and is recycled via line 46 to evaporator 26 for recovery of contained glycerol. Bottoms from flash tower 41 and column 43 are removed via lines 47 and 48 respectively, combined and de-salted in centrifuge 49. The salt is washed with water introduced via line 50. The salt is discarded via line 51 and the washings are transferred via line 52 with other salt washings to evaporator 26 for the recovery of contained glycerol. The recovered anhydrous glycerol passes from centrifuge 49 via line 53 to steam vaporizer 54. Bottoms from the final separation of glycerol in refining still 60 are also returned via line 62 to steam vaporizer 54. All the remaining glycerol passes overhead via line 55 to column 43 and the bottoms, free of glycerol are eliminated via line 56. The anhydrous glycerol condensed in partial condenser 45 is transferred via line 57 to stripper 58 from which unreacted monochlorohydrin is removed overhead along with some glycerol via line 23 and thus returned to the hydrolysis. The stripped glycerol is charged via line 59 to vacuum steam refining still 60 from which U.S.P. glycerol is removed overhead via line 61. Bottoms are removed via line 62 and recycled to steam vaporizer 54.

*Example I*

An aqueous solution of 8.5 percent of glycerol monochlorohydrin in water was circulated by pumping it at a rate of about 5000 pounds per hour through a tubular chlorine dissolving section with a chlorine inlet at its entrance, a T inlet for aqueous allyl alcohol, a heat exchanger, a surge tank and back to the chlorine dissolving section. Chlorine was vaporized and measured into the circulating stream at a rate of about 8.9 pounds per hour. Allyl alcohol was pumped at 7.2 pounds per hour into a mixing T where it was diluted with about 134 pounds per hour of water. The 5.1 percent aqueous allyl alcohol was pumped through a T into the circulating stream which then passed through a heat exchanger into a surge tank and back to the chlorine dissolving section. The molar ratio of allyl alcohol to chlorine was 1:1. The liquor removed from the surge tank at a rate of about 150 pounds per hour analyzed 8.5 percent glycerol monochlorohydrins and 0.8 percent glycerol dichlorohydrins, substantially a quantitative yield.

The chlorohydrin solution was neutralized to a pH of 4 by pumping it at a rate of about 150 pounds per hour with 60 pounds per hour of 20 percent soda ash solution into a stripping column. The top temperature was maintained at 98° C. The overhead carbon dioxide water and organic impurities were discarded. The stripped bottoms were pumped with about 340 pounds per hour of 20 percent soda ash solution through a stainless steel coil where the temperature was maintained at 150° C. The pressure was 64 p.s.i.g. and the retention time was three hours.

The hydrolysate was evaporated, desalted and concentrated. The sweet water from the final stage of evaporation was recycled and used for diluting allyl alcohol. Monochlorohydrins were stripped from the concentrated glycerol and recycled to the hydrolysis operation. Finally the glycerol was vacuum distilled to produce an overall yield, based on allyl alcohol charged, of about 84 percent of U.S.P. glycerol.

*Example II*

Commercial grade allyl alcohol was diluted with water to 5.3 percent concentration in a storage vessel. This was fed continuously to a system in which a dilute aqueous solution of glycerol chlorohydrins was recirculated and maintained at a temperature of 110° F. Chlorine was injected into the solution in equimolar proportion to the allyl alcohol, and the product solution, containing 9.5 weight percent chlorohydrins, was drawn off at such a rate as to keep the volume in the system constant.

The chlorohydrin solution was mixed in a pipe with a 20 percent solution of $Na_2CO_3$, in sufficient quantity to give about 5 percent molar excess of $Na_2CO_3$ over the combined chlorohydrins and HCl. The mixture was fed to a packed column, heated at the bottom from the top of which carbon dioxide and minor proportions of water vapor and organic impurities were removed and discarded. The stripped chlorohydrin solution was hydrolyzed by passing it through two stirred reactors placed in series and maintained at 300° F. and 64 p.s.i.g. Additional $CO_2$ liberated in these vessels was vented to waste and the solution, after neutralization was passed to a two-stage evaporator. The liquor was evaporated in one stage to a point just short of salt crystallization and, in a second stage, salt crystallized. It was removed, washed and discarded.

Vapors from the two evaporator stages, containing traces of glycerol and impurities, were condensed and recycled for use in diluting allyl alcohol. The crude glycerol was flashed overhead to separate it from relatively nonvolatile bottoms. The overhead was vacuum fractionated removing a first overhead fraction comprising largely water but containing significant amounts of glycerol. It was recycled to the evaporator. A second overhead fraction, after removal of the water, comprised the bulk of the unreacted chlorohydrin and glycerol. This fraction was recycled to the hydrolysis. Finally glycerol was vacuum steam distilled overhead, the product containing less than 30 parts per million of chlorine and otherwise meeting U.S.P. specifications.

The process of Example II was repeated except that stripping after hydrolysis was omitted. The product failed to meet U.S.P. XV tests for chlorides, for chlorinated compounds and for color.

The process of Example II was repeated except that the vacuum fractionation of the glycerol to remove unreacted chlorohydrins was omitted. The final product failed to meet the U.S.P. XV specification for chlorinated compounds.

The process of Example II was repeated except that the unreacted chlorohydrins recovered by vacuum fractionation of the glycerol were not recycled. Although the glycerol product met all U.S.P. XV specifications, the yield was reduced by 5 percent.

What is claimed is:
1. In the manufacture of glycerol by the steps of:
 (A) hypochlorination of allyl alcohol with chlorine in aqueous solution to produce aqueous glycerol chlorohydrins;
 (B) hydrolysis of the aqueous glycerol chlorohydrins with sodium carbonate to produce aqueous glycerol; and
 (C) separation of substantially anhydrous glycerol from the aqueous glycerol by vaporization of water and separation of salt;
the improvement of:
 neutralizing the aqueous glycerol chlorohydrins from said hypochlorination (A) with an alkali selected from the group consisting of sodium hydroxide and sodium carbonate to a pH of about 4 to 5 and fractionally distilling the neutralized aqueous glycerol chlorohydrins to remove impurities overhead which distill out with water at temperatures up to the boiling point of water.

2. In the manufacture of glycerol by the steps of:
 (A) hypochlorination of allyl alcohol with chlorine in aqueous solution to produce aqueous glycerol chlorohydrins;
 (B) hydrolysis of the aqueous glycerol chlorohydrins with sodium carbonate to produce aqueous glycerol; and
 (C) separation of substantially anhydrous glycerol from the aqueous glycerol by vaporization of water and separation of salt;
the improvement of:
 neutralizing the aqueous glycerol chlorohydrins from said hypochlorination (A) with an alkali selected from the group consisting of sodium hydroxide and sodium carbonate to a pH of about 4 to 5 and fractionally distilling the neutralized aqueous glycerol chlorohydrins to remove impurities overhead which distill out with water at temperatures up to the boiling point of water; and
 fractionally distilling said substantially anhydrous glycerol obtained in (C) to remove overhead glycerol chlorohydrins substantially free from more volatile impurities and recycling the recovered glycerol chlorohydrins to the hydrolysis (B).

References Cited in the file of this patent
UNITED STATES PATENTS
2,311,023    Brooks _____ Feb. 16, 1943
OTHER REFERENCES
Williams et al., Chem. and Met. Eng., vol. 47, pp. 834–838 (1940).